United States Patent
Filipek

(10) Patent No.: US 7,699,262 B2
(45) Date of Patent: Apr. 20, 2010

(54) DETACHABLE HYDROFOIL TRIM TABS FOR USE WITH SEAPLANE FLOATS FOR ASSISTING WITH LOWER SPEED ON-PLANE CONDITION AND STABILITY DURING STEP TURNING/CHINE WALK MANUEVERS

(76) Inventor: Gerald Filipek, 57877 Main St., Washington, MI (US) 48048

( * ) Notice: Subject to any disclaimer, the term of this patent is extended or adjusted under 35 U.S.C. 154(b) by 197 days.

(21) Appl. No.: 11/942,976

(22) Filed: Nov. 20, 2007

(65) Prior Publication Data
US 2008/0302908 A1 Dec. 11, 2008

Related U.S. Application Data

(60) Provisional application No. 60/866,925, filed on Nov. 22, 2006.

(51) Int. Cl.
*B64C 35/00* (2006.01)
(52) U.S. Cl. .................. 244/105; 244/101; 244/112; 114/272; 114/273; 114/274; 114/130; 114/132
(58) Field of Classification Search ............. 244/101, 244/105, 112; 114/272, 283, 292, 271, 273, 114/274, 285–287, 39.24, 162, 167; 441/79
See application file for complete search history.

(56) References Cited

U.S. PATENT DOCUMENTS

| | | | | |
|---|---|---|---|---|
| 4,421,492 A * | 12/1983 | Leva | ............................ | 441/79 |
| 4,493,665 A * | 1/1985 | Liddle | ............................ | 441/79 |
| 4,701,144 A * | 10/1987 | DeWitt, III | ................... | 441/79 |
| 5,176,553 A * | 1/1993 | Tuttle | ............................ | 441/79 |
| 5,464,359 A * | 11/1995 | Whitty | ............................ | 441/79 |
| 5,672,081 A * | 9/1997 | Whitty | ............................ | 441/79 |
| 6,068,531 A * | 5/2000 | Patterson | ..................... | 441/74 |
| 6,318,670 B1 * | 11/2001 | Center | ............................ | 244/105 |
| 6,595,817 B1 * | 7/2003 | Chang | ............................ | 441/79 |
| 6,752,674 B2 * | 6/2004 | Jolly | ............................ | 441/79 |
| 6,916,220 B2 * | 7/2005 | Davey et al. | ................... | 441/79 |
| RE38,840 E * | 10/2005 | Patterson | ..................... | 441/74 |
| 7,025,645 B1 * | 4/2006 | Hsieh | ............................ | 441/79 |
| 7,029,352 B1 * | 4/2006 | Suzuki | ............................ | 441/79 |
| 7,285,031 B2 * | 10/2007 | Mair et al. | ..................... | 441/79 |

* cited by examiner

*Primary Examiner*—Timothy D Collins
*Assistant Examiner*—Justin Benedik
(74) *Attorney, Agent, or Firm*—Gifford, Krass, Sprinkle, Anderson & Citkowski, P.C.

(57) ABSTRACT

A hydrofoil trim tab for use with each of a pair of seaplane floats, each tab including a substantially planar shaped body secured to an inside facing location of each float such that a pair of tab bodies are arrayed in opposing and inwardly directed fashion relative to the floats. Each tab is further constructed as a two piece article, a first portion being either mechanically secured or welded to the surface of the float, with a second portion being releasably/breakaway attached to the first portion, such as by frangible fasteners engaging a slidably connection location between the portions. In this fashion, inadvertent breakage of a trim tab at the frangible location will prevent damage to the float.

10 Claims, 4 Drawing Sheets

DETACHABLE HYDROFOIL TRIM TABS FOR USE WITH SEAPLANE FLOATS FOR ASSISTING WITH LOWER SPEED ON-PLANE CONDITION AND STABILITY DURING STEP TURNING/CHINE WALK MANUEVERS

CROSS-REFERENCE TO RELATED APPLICATIONS

This Application is a Non-Prov of Prov (35 USC 119(e)) application 60/866,925 filed on Nov. 22, 2006 and entitled RESIN CONSTRUCTABLE AND DETACHABLE HYDROFOIL TRIM TABS FOR USE WITH SEAPLANE FLOATS FOR ASSISTING WITH LOWER SPEED ON-PLANE CONDITION AND STABILITY DURING TURNING/CHINE WALK MANEUVERS.

FIELD OF THE INVENTION

The present invention is directed to hydrofoil (i.e., trim tab) design for assisting in establishing an on-plane relationship of a buoyant and propelling craft. More particularly, the present invention discloses a trim tab design capable of being incorporated in inwardly facing and opposing fashion relative to a pair of seaplane floats. The trim tabs are typically constructed of either a metallic or a resinous material, such as in a two-piece fashion, to promote detachability in the instance of an object striking the tab, and are typically located just aft of a center of buoyancy associated with each float.

BACKGROUND OF THE INVENTION

An example of a prior art water wing for use in an airplane float is disclosed in U.S. Pat. No. 6,318,670, issued to Center, and which discloses a small wing arranged on an inside face of each of a pair of airplane floats. The wings are disclosed as being fixed into place on the floats, for the purpose of enabling a (sea) plane to achieve flight, e.g. to achieve an on-step position relative to the surface of the water, in a shorter distance than in instances where such wings are not employed. This allows the aircraft to 1) carry additional weight than previously possible and 2) to take off from smaller bodies of water.

As disclosed, the wing in Center is disclosed as a one piece article, and which is secured in an inside facing and slightly downwardly angled fashion. In practice, and as a result of forces of the water acting upon the float chine during both takeoff and landing (this defined to be the angular intersection of the sides and bottom of the float), there exists a tendency for the wing to break off, and which in more extreme situations will involve the integrity of the float being breached and, as a result, sunk. The possibility is wing breakage is increased exponentially with the degree of chine forces acting upon the float, such as occurring during turning of the seaplane upon the water (see FIG. 3B) or as a result of "walking" or independent sideways travel of the boat relative to its direction of travel along the surface of the water.

A fixed wing or fin design, such as in Center, requires that pilots exercise particular attention to the potential damage which can be caused to floats during ground handling of the float aircraft. Minor damage to the fin and float as a result of mishaps involving improperly designed ground handling equipment can occur, and which the pilot might not see during such as pre-flight procedures. Given further that the fin is submerged underneath the float at the time of launch, the occurrence of such damage is often missed.

Another disadvantage associated with fixed mounted wings or fins, such as again illustrated by Center, concerns the ability of ground handling personnel to launch and/or retrieve a seaplane craft exhibiting a fixed mounted fin associated with the float, and such as is typically caused by the requirement of mounting the fins through the drilling of specialty rivets. Removal of the rivets cannot typically be accomplished without inflicting damage to the wing and/or the integrity of the float. Furthermore, conventional ground handling equipment available at most maintenance and storage facilities does not provide clearance for the fixed in place fin interference (this further measured in one application as a distance between the internal distance between the left and right mounted fins).

Consequently, specialty tooling and equipment is required in order for ground crew to handle float aircraft on land which includes the fixed in place fins. Given the relatively small number of aircraft currently equipped with fixed wings such as shown in Center, the likelihood of such aircraft handling facilities investing in such equipment is relatively low.

SUMMARY OF THE INVENTION

The present invention discloses a hydrofoil trim tab for use with each of a pair of seaplane floats, each tab including a substantially planar shaped body secured to an inside facing location of each float such that a pair of tab bodies are arrayed in opposing and inwardly directed fashion relative to the floats. Each tab is further constructed as a two piece article, a first portion being either mechanically secured or welded to the surface of the float, with a second portion being releasably/breakaway attached to the first portion, such as by frangible fasteners engaging a slidably connection location between the portions.

In a preferred application, either or both the first and second portions of the tab are constructed of a flexible and durable material, such as including an aluminum or polymer, the advantage of which is to provide a degree of flexibility, thus permitting the tab to flex or bend in response to chine/walking forces of intermediate severity, and to revert back to its original shape In this fashion, inadvertent breakage of a trim tab at the frangible location, such as a result of excessive hydraulic forces resulting from walking or chine of the plane upon the surface of the water, or the possible incidence of an object in the water hitting the tab associated with the moving float, will cause only the second portion to detach, thereby preventing damage to the associated float.

Additional applications include both the first and second portions capable of being easily removed from each of the seaplane floats, and such as to allow conventional ground handling equipment/trailers to transport the trailer without damage to the fin or float. It is also envisioned that the fin design can be either retrofit mounted to an existing float or, in additional preferred applications, can be manufactured into the originally designed float, and such as to maximize the ease of removability, such as further through the use of channel and slot engagement between the first portion and the surface of the float, and as an alternative to the use of mechanical fasteners, seam welding or the like.

BRIEF DESCRIPTION OF THE DRAWINGS

Reference will now be made to the attached drawings, when read in combination with the following detailed description, wherein like reference numerals refer to like parts throughout the several views, and in which:

FIG. 3b illustrates, in overhead fashion, the turning/chiming condition of the seaplane shown in FIG. 3a;

DETAILED DESCRIPTION OF THE PREFERRED EMBODIMENTS

The present invention discloses a hydrofoil (i.e. trim tab) design for assisting in establishing an on-plane relationship of a buoyant and propelling craft. More particularly, the present invention discloses a trim tab design capable of being incorporated in inwardly acing and opposing fashion relative to a pair of seaplane floats.

As will be further described in subsequent detail, the trim tabs are typically constructed of a flexible and resilient material, such as an aluminum or polymeric resin, and in order to promote detachability in the instance of excessive chine/walking forces, or of an object striking the tab. In a preferred application, the tab is located just aft of a center of buoyancy associated with each float, one aspect of which is in order to maximize the rate at which an on-plan condition of the float is achieved during takeoff.

Figure 1:
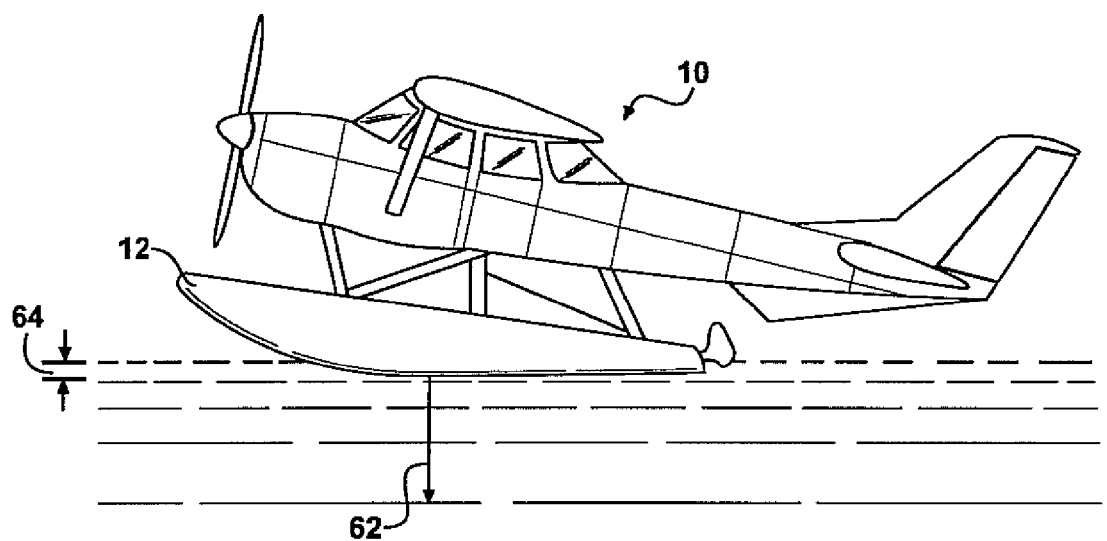
FIG. 1 is a first illustration of a seaplane in a nose up (pre-planing) configuration associated with either a stationary or lower speed motion upon a body of water.

Referring now to FIG. 1, a first illustration is shown at 10 of a seaplane in a nose up (pre-planing) configuration associated with either a stationary or lower speed motion upon a body of water. In particular, and as is known in the art, associated seaplane floats, see at 12, are mounted in downwardly extending and supporting fashion upon a body of water.

Figure 4:
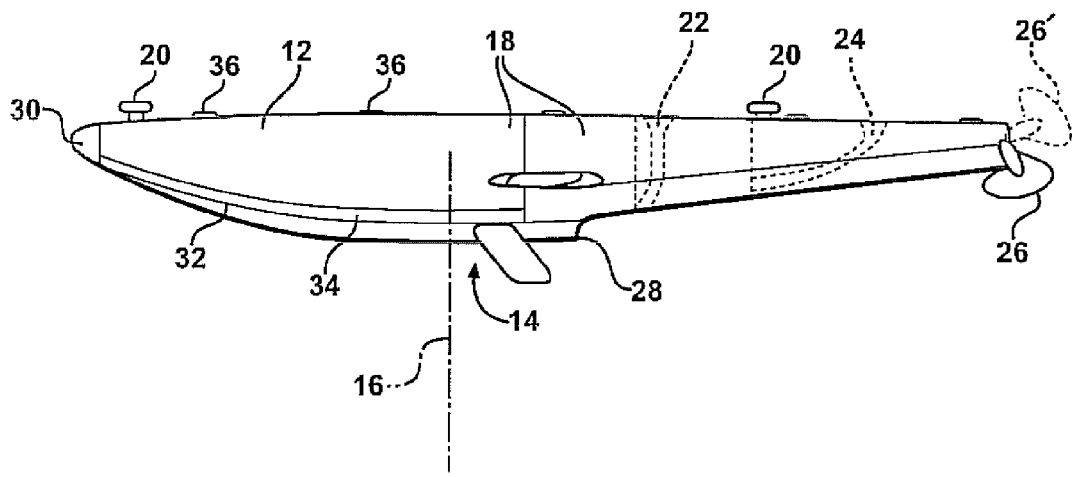
FIG. 4 is a side plan view of a seaplane float, such as which to the inwardly directed, resin constricted and detachable hydrofoil trim tab may be secured.

As shown in FIG. 4, a side plan view of the seaplane float 12 according to the present invention includes the mounting of an inwardly directed, flexible and detachable hydrofoil trim tab, as generally shown at 14, and which is secured to an inwardly/downwardly directed location positioned aft of the associated center of gravity/center of buoyancy of the float (representatively shown at 16 in FIG. 4) when acting against the body of water. The various features of the seaplane float are clearly illustrated in FIG. 4 and include such as bulkheads 18, upper mooring cleats 20, bilge pump 22, associated opening 24, retractable rear water rudder (see positions 26 and 26') and a skeg 28 from which the fin 14 extends in order to provide stability.

Additional features of a typical float includes a forward end bumper 30, forward underside keel 32 (this further defining a side extending chine location as referenced at 34), as well as hand hole covers 36, such as which can be further associated with each bulkhead. It is important however to point out that none of these features provide the aspects of stability (e.g. during turning) and reduced speed on-plane of the seaplane, as provided for by the hydrofoil trim tab 14 design of the present invention.

Referring to the enlarged sectional illustration in perspective of FIG. 5, a selected trim tab 14 is again shown and includes a first portion collectively including a float surface bracket mounting location 38 and a generally planar and angular extending support plate portion 40. As described previously, the first portion can be either mechanically secured to the surface of the float (such as through the use of appropriate fasteners not shown), in certain embodiments welded to the surface of the float 12 or otherwise chemically/adhesively bonded or in-molded into the float construction, this further being a factor of whether the material content of the first portion (38 & 40) includes either a lightweight aluminum or a durable and polymeric based composition.

According to the alternative embodiments discussed herein, the bracket mounting location 38 can also desirously be reconfigured to facilitate the easy and fast removal of the fin assembly from the surface of the float 12, and without damage to either item. This can be accomplished through the use of removable and non-damaging fasteners (other than rivets) and as is representatively shown at 41 in FIG. 5A. It is also envisioned that other mechanisms for releasably securing the fin to the float can include such as a tab and slot or other lengthwise inserting and locking arrangement (not shown) for fixedly positioning the first portion to the float surface in use while permitting the same to be quickly removed, either in the water, suspended or on land, in non-damaging fashion.

Figure 5A:
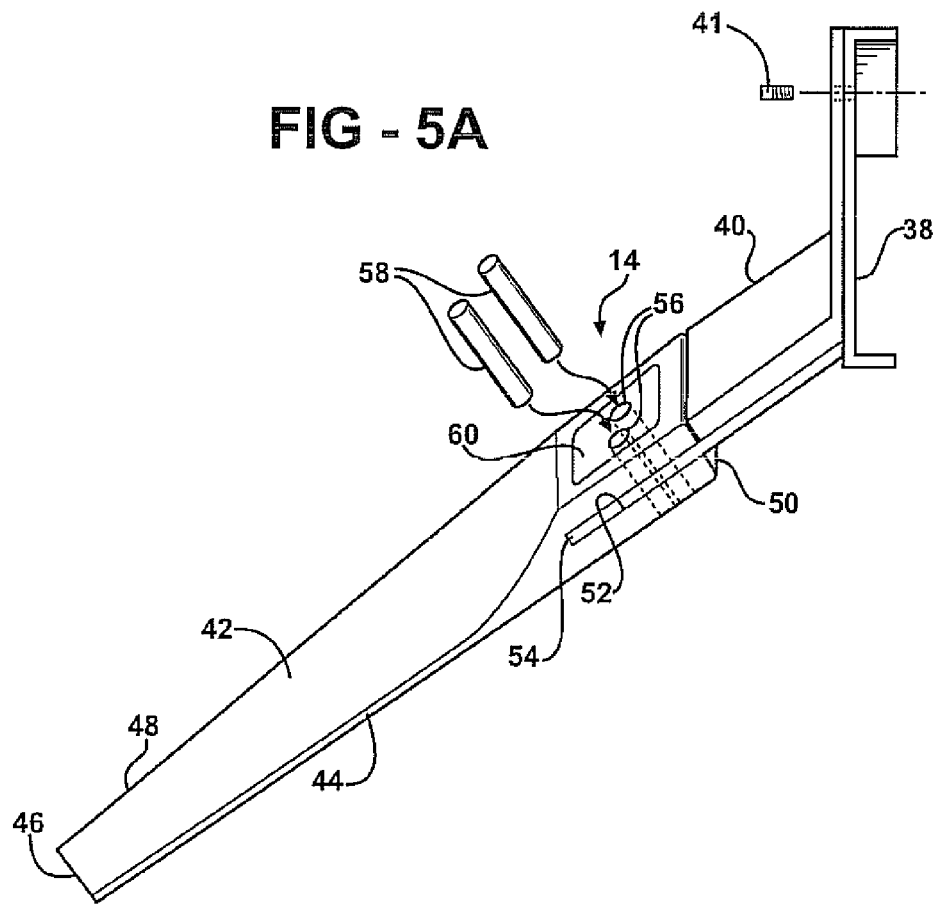
FIG. 5A is a sectional illustration in perspective of a selected trim tab and illustrating the first and second portions interengageable at a location exhibited such as by frangible fasteners engaging a slidable connection location between the portions.
Figure 5B:
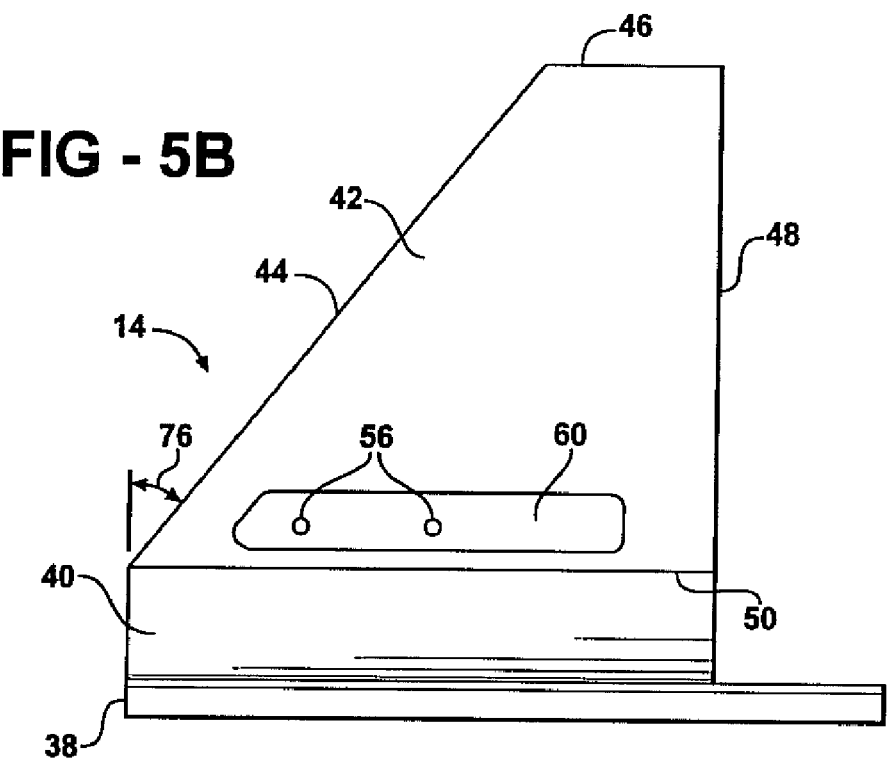
FIG. 5B is a top plan view of the two piece trim tab illustrated in FIG. 5A.
Figure 5C:
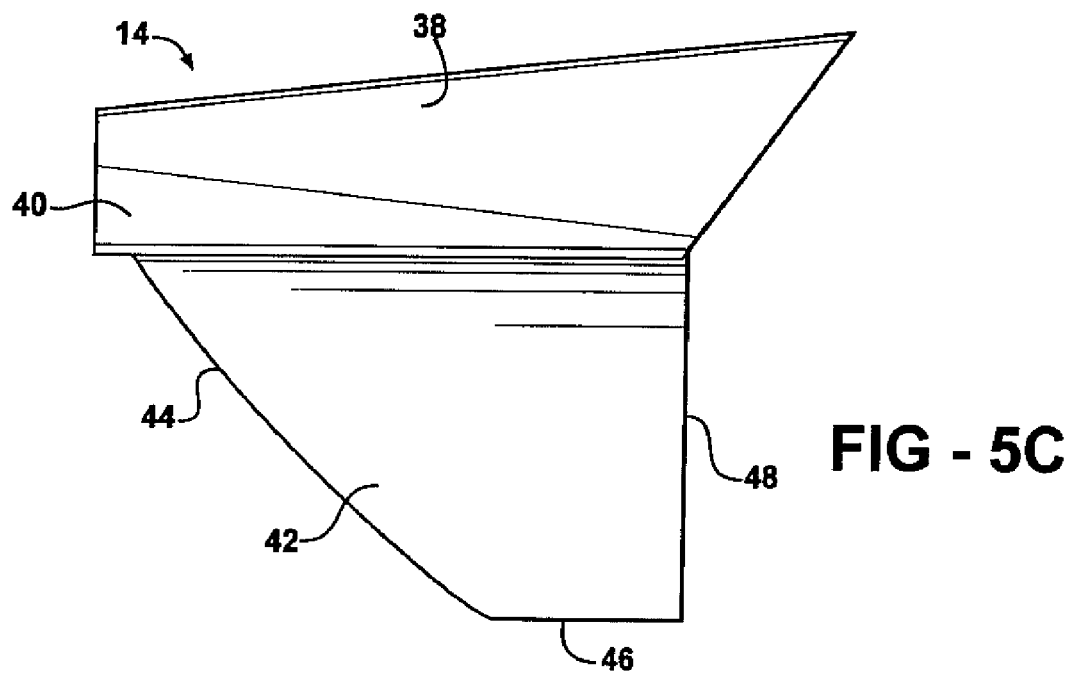
FIG. 5C is a side plan view of the tab in FIG. 5A.

A second portion is illustrated and exhibits an elongated, fin or tab-like body configuration 42 (see also FIGS. 5B and 5C) having a selected shape and thickness and including interconnecting forward 44, exterior side 46, and trailing 48 edges. As with the first portion (38 & 40), the second body portion 42 can incorporate a flexible aluminum or polymeric composition. FIG. 5A best illustrates the manner in which the forward edge 44 exhibits a thinner, more blade-like appearance, with the body 42 of the second portion gradually thickening, both in a direction towards an inner interconnecting edge 50, as well as the trailing edge 48.

The inner connecting edge 50 of the second tab portion 42 further exhibits an inwardly formed slot or channel, at 52 as shown in FIG. 5A, the slot extending both in a selected length and widthwise fashion, and within which an end-most extending portion 54 associated with the generally planar and angular extending support plate 40 of the first body portion seats. Thickness directed apertures, see at 56 in FIG. 5A, are established in aligning and crosswise directed fashion in the slidably disposed and overlapping locations established between the inner end of the second body portion 42 and the outermost extending portion 54 of the first portion support plate 40.

A pair of (fracturable) fasteners, see at 58, are seated or otherwise secured within the apertures 56. In use, and as will be further described, excessive chine/walking forces or the incidence of an object in the water striking the tab 42 associated with a moving float 12, will cause the body 42 of the tab assembly to fracture or disengage, from the extending-most portion 54 of the first body in a Fashion to avoid damaging the integrity of the float (and such as which can occur in the instance of a one piece arrangement secured directly to the float and by which the uncertainty remains as to where a fracture line may occur). A surface mounted and support plate, see at 60, is associated with the mounting location of the second body portion 42 and can further serve to facilitate the localization of a selected breakaway/fracture point in the event that an excessive force is experienced by the float 12 and associated tab 14.

The fasteners 58 may be constructed of a selectively brittle material (such as a graphite or carbon) and which are rated to fail upon experiencing, primarily, an impact with an object in the water and, to a less common degree, in the instance of an overly extreme amount of chine or walking force exceeding the normal dynamic performance characteristics of the tab. Additional embodiments may include alternate configurations of fracture points established between the first and second portions, these possibly incorporating other inter-engagement mechanisms than selectively fracture-rated fasteners.

Additional applications include both the first 40 and second 42 portions capable of being easily removed from each of the seaplane floats 12, and such as to allow conventional ground handling equipment/trailers to transport the trailer without damage to the fin 14 or float 12. It is also envisioned that the fin design can be either retrofit mounted to an existing float or, in additional preferred applications, can be manufactured into the originally designed float, and such as to maximize the ease of removability, such as further through the use of channel and slot engagement between the first portion and the surface of the float, and as an alternative to the use of mechanical fasteners, seam welding or the like. As previously described, the ability to remove the fin cleanly from the surface of the float, such as during the seaborne aircraft being transported on land by conventional trailer equipment, is an advantage not offered by prior art fin designs.

In normal operation, the seaplane center of gravity (see at 62 in FIG. 1) acts downwardly against the water and is offset by an opposing and upwardly associated center of buoyancy. The seaplane float 12 in the condition of FIG. 1 is further shown at a depth 64. Aircraft equipped with floats must contend with many factors in order to reach flying speed. Furthermore, the time and length of water run are dependent upon many things, from air temperature to aircraft weight, wind speed and direction.

Figure 2:
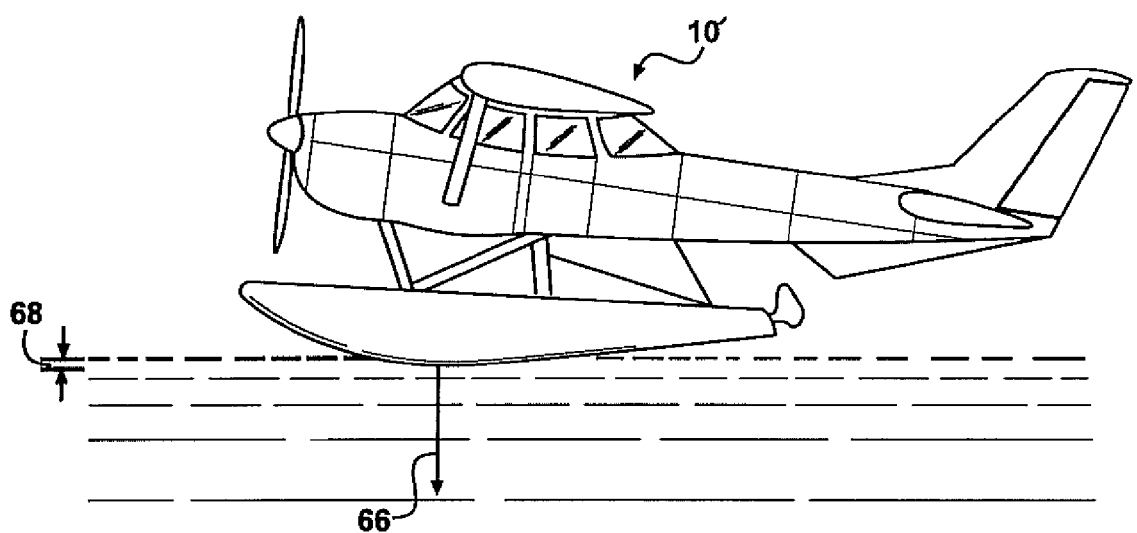
FIG. 2 is a succeeding on-step configuration of the seaplane shown in FIG. 1, associated with a higher speed/takeoff condition.

FIG. 2 illustrates a succeeding on-step configuration of the seaplane 10 shown in FIG. 1 (and at 10' in FIG. 2), associated with a higher speed/takeoff condition and by which forward thrusting motion of the seaplane (e.g. through its propeller in the variant indicated) pitches the plane forwardly about a horizontal axis defined perpendicular to a further axis extending substantially axially along its fuselage, and so that the resultant center of gravity is moved forwardly (to position 66). This results further in the likewise forward rotation (e.g. pitch) of the floats 12 to a substantially on-plane condition and whereby a reduced depth of displacement (see further at 68 and as compared to 64 in FIG. 1), and results in the floats 12 substantially skimming along the surface of the water in the on-plane condition.

Figure 3A:
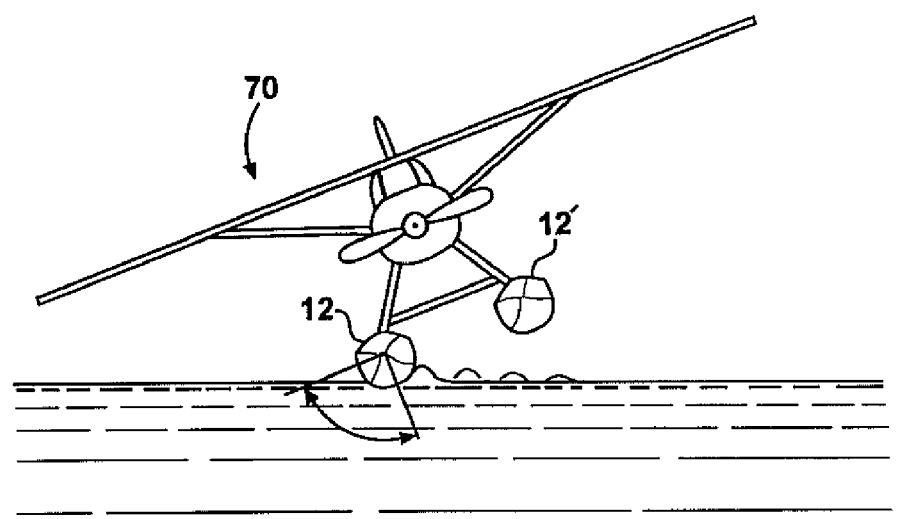
FIG. 3a illustrates a frontal illustration of a seaplane as known in the prior art and which is experiencing an imbalanced centrifugal force condition, such as resulting from turning (chine walk/sliding/porpoising) of the plane.
Figure 3B:
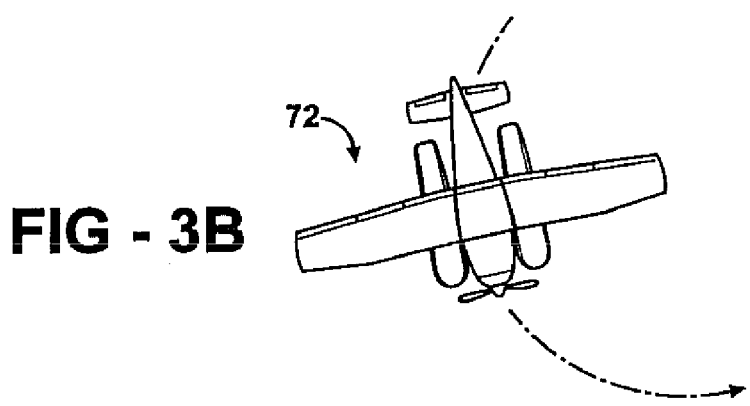

As is further known, the planning/on-step condition of the seaplane (again shown in FIG. 2) corresponds to a takeoff ready condition whereby the frictional effect of the floats 12 acting upon the water is reduced. FIGS. 3a and 3b illustrate frontal 70 and overhead 72 views, respectively, of a seaplane, such as again known in the relevant art, and which is experiencing imbalanced centrifugal force conditions, such as further resulting from any of a series of imbalance force induced motions, collectively referenced to include turning, chine walk, lateral sliding, or porpoising of the plane. An additional problem associated with conventional seaplane float mounts, beyond the requirement of substantial forward velocity of the plane in order to "break plane", is the tendency of the plane's motion to tilt/roll sideways, this causing one float (see at 12') to break contact with the water surface as is further again illustrated in FIG. 3a, and relative to the other float 12 which remains in contact with the water surface.

Figure 3C:
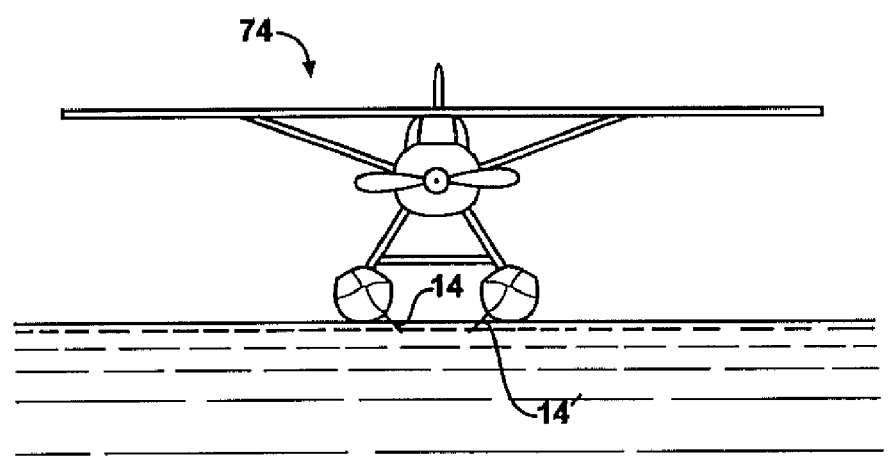
FIG. 3c is a further view, similar to that shown in FIG. 3a, and showing a seaplane incorporating a pair of inwardly and opposingly disposed hydrofoil trim tabs for maintaining stability during initiation and maintenance of an on-step condition.

As previously described, the trim tab hydrofoil design is intended to secure in paired and inwardly opposing fashion, as best shown at 74 in FIG. 3c and which includes tabs 14 and 14'. As previously described, each of the trim tabs are constructed of a material (again either metal, resin based plastic or hybrid of materials) the purpose for which is to provide break-away ability of a selected tab, again in response to being struck by an object in the water, and while the resilient construction of the tabs are such that they are capable of absorbing most of the imbalance forces created as a result of the chine or walking motions of the plane and its floats.

While no specific angular orientation is relied upon in determining a desired performance characteristic of the tab 14, it is contemplated that its leading edge (see as best shown at 76 in FIG. 5a) can extend in one non-limiting variant, from such as 15° to 60° relative to a horizontal plane. While also not intended to be limiting in any particular regard as to the possible range of design afforded the tab design, one variant can exhibit an approximately 60 $in^2$ surface area associated with each of the opposingly and inwardly/downwardly extending tabs 14 and 14', and in order to provide the desired sizing for accommodating the required performance characteristics of a typically sized seaplane float. Furthermore, the body of the hydrofoil trim tab can be further contoured and modified (such as previously described in reference to FIG. 5A) to enhance its fluid aerodynamic profile in a manner consistent with achieving the desired performance aspects of the float.

The present design will therefore facilitate detachability upon higher speed impacts, as well as enabling the aircraft to complete its flight and land with the least possible damage to the float. As such, the loss of only one or both hydrofoil tabs will, at most, return the float plane to its original performance parameters. It is further contemplated however that additional variants of the two piece tab design may include more durable metallic or other synthetic material constructions and, furthermore, that the tabs may be further designed so as to be retractable either against or within the associated floats, while still retaining their desired dynamic operating and safety breakaway characteristics.

As shown throughout the several views of the embodiment illustrated, each tab 14 is again mounted to an inside facing location of a selected float, in one preferred design embodiment being located just aft of the associated center of buoyancy of the float (see again at 16 in FIG. 4). The extending substantially planar shaped and selectively flared edge body portion, again at 42, is angled downwardly, such as in a fin-like fashion, and in order to contact the water to a desired angle or depth.

The angle of taper of the tab body 26, combined with its overall shape and contours of its leading 44, side 46, and rear/trailing 48 edge profiles are again all calculated to provide a degree of stability while permitting the seaplane to achieve maximum lift and lower speeds and/or to reach and stay on step/plane at such lower speeds. As previously described, the foil size and angle may further be calculated (or altered) based upon float size and/or model. Additional advantages associated with the design include reducing bow rise and providing stability at both high and lower speed step turns (see again FIG. 3b) as well as again the reduction of chine walk, sliding or porpoising.

Having described my invention, other and additional preferred embodiments will become apparent to those skilled in the art to which it pertains, and without deviating from the scope of the appended claims.

I claim:

1. A hydrofoil trim tab for use with each of a pair of seaplane floats, said trim tabs comprising:
   a first portion releasably secured to a float having a float surface bracket mounting location and a generally planar and angular extending support plate portion;
   a second portion exhibiting an elongated body and engageable in overlapping fashion with said second portion overlapping overtop said first portion, both portions exhibiting a selected shape and thickness with leading, exterior side, and trailing edges; and
   at least one fracturable fastener inserting crosswise through the overlapping sections associated with said first and second portions;
   said second portion exhibiting a degree of dynamic motion and resiliency in response to imbalance forces exerted upon the float during takeoff and landing from a body of water, said second portion further being disengageable from said first portion as a result of fracturing of said fasteners and in response to an excessive degree of experienced force, and without damage to the float; and
   the pair of said tabs secured to inside facing locations associated with each float, said tabs each exhibiting a specified shape, size and configuration, a pair of said bodies being arrayed in opposing, inwardly, and downwardly angled and directed fashion relative to the floats.

2. The invention as described in claim 1, further comprising each of said first and second portions having a specified shape and size and exhibiting at least one of lightweight aluminum and a durable and polymeric based composition.

3. The invention as described in claim 1, said leading edge of said second portion exhibiting a thinner, more blade-like appearance, with said elongated body gradually thickening, both in a direction towards an inner interconnecting edge with said first portion, as well as in a direction towards said trailing edge.

4. The invention as described in claim 3, said inner connecting edge associated with said second portion further comprising an inwardly formed channel extending both in a selected length and widthwise fashion, an end-most extending portion associated with said generally planar and angular extending support plate of said first body portion seating in an slidably aligning fashion within said channel.

5. The invention as described in claim 4, further comprising thickness directed apertures established in aligning and crosswise extending fashion relative to said slidably disposed and overlapping locations established between said inner end of said second body portion and said outermost extending location of said first portion support plate, said fracturable fasteners being seated or otherwise secured within said apertures.

6. The invention as described in claim 5, further comprising a surface mounted support plate associated with said mounting location of said second body portion and facilitating localization of a selected breakaway/fracture point in the event that an excessive force is experienced by the float and associated tab.

7. The invention as described in claim 5, each of said fasteners exhibiting a specified shape and size and further comprising a selectively brittle material which is rated to fail upon experiencing a predetermined amount of force exerted upon said tab.

8. The invention as described in claim 1, each of said tabs having a specified shape and size and being secured to a location of the associated float just aft of its center of buoyancy.

9. The invention as described in claim 1, said leading edge associated with said second body portion extending at an angle in a range of 15° to 60° relative to a horizontal plane.

10. A pair of seaplane floats, each incorporating dynamic performing and on-step condition inducing trim tabs, comprising:
    a surface bracket associated with an inside surface mounting location of the float and exhibiting a generally planar and angular extending support plate portion; and
    an elongated body engaged in overlapping fashion to an extending end of said surface bracket said elongated body overlapping overtop said extending support plate, said body having a selected shape and thickness and including leading angled, exterior side, and trailing edges;
    said elongated body exhibiting a degree of dynamic motion and resiliency in response to imbalance forces exerted upon the float during takeoff and landing from a body of water, said body further being disengageable from said surface mounted bracket, at a location remote from a surface of the float, and in response to an excessive degree of experienced force without damage to the float,
    the pair of said tabs secured to inside facing locations associated with each float, said tabs each exhibiting a specified shape, size and configuration, a pair of said bodies being arrayed in opposing, inwardly, and downwardly angled and directed fashion relative to the floats.

* * * * *